US010268693B1

(12) United States Patent
Nanda et al.

(10) Patent No.: US 10,268,693 B1
(45) Date of Patent: Apr. 23, 2019

(54) MANAGING MIGRATION OF VIRTUAL FILE SERVERS

(71) Applicant: EMC IP HOLDING COMPANY LLC, Hopkinton, MA (US)

(72) Inventors: Kumari Bijayalaxmi Nanda, Edison, NJ (US); Walter C. Forrester, Berkeley Heights, NJ (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/886,961

(22) Filed: Feb. 2, 2018

(51) Int. Cl.
*G06F 12/00* (2006.01)
*G06F 17/30* (2006.01)
*G06F 3/06* (2006.01)
*G06F 9/50* (2006.01)
*H04L 29/08* (2006.01)
*G06F 9/455* (2018.01)

(52) U.S. Cl.
CPC ........ *G06F 17/30079* (2013.01); *G06F 3/065* (2013.01); *G06F 3/0646* (2013.01); *G06F 3/0647* (2013.01); *G06F 9/5083* (2013.01); *G06F 17/30197* (2013.01); *G06F 17/30233* (2013.01); *H04L 67/1097* (2013.01); *G06F 2009/4557* (2013.01); *G06F 2009/45575* (2013.01)

(58) Field of Classification Search
CPC ......... G06F 17/30079; G06F 17/30197; G06F 17/30233; G06F 3/0646; G06F 3/0647; G06F 3/065; G06F 9/5083; G06F 2009/4557; G06F 2009/45575; H04L 67/1097
See application file for complete search history.

(56) References Cited

U.S. PATENT DOCUMENTS 7,383,463 B2 * 6/2008 Hayden ............... G06F 11/2069
714/4.11

* cited by examiner

*Primary Examiner* — Shawn X Gu
(74) *Attorney, Agent, or Firm* — Krishnendu Gupta; Lesley Leonessa

(57) ABSTRACT

A method is used in managing migration of virtual file servers. The method migrates a virtual file server from a source storage processor to a destination storage processor in a storage system. The storage system includes the source and the destination storage processors. The virtual file server comprises a root file system, a configuration file system, and a set of user file systems. The method enables concurrent access to the root file system from both source and destination storage processors during the migration until the set of user file systems is migrated from the source storage processor to the destination storage processor.

20 Claims, 5 Drawing Sheets

| VSP ID 1 410 | OWNER | |
| | AUTHENTICATION | |
| | ROOT FS | UDFS ID |
| | CONFIG FS | UDFS ID |
| | HOST FS A | UDFS ID |
| | HOST FS B | UDFS ID |
| | . . . | . . . |
| | HOST INTERFACES | |

FIG. 4

MANAGING MIGRATION OF VIRTUAL FILE SERVERS

BACKGROUND

Technical Field

This application relates to managing migration of virtual file servers.

Description of Related Art

Data storage systems typically include one or more physical storage processors (SPs) accessing an array of disk drives and/or electronic flash drives. Each SP is connected to a network, such as the Internet and/or a storage area network (SAN), and receives transmissions over the network from host computing devices ("hosts"). The transmissions from the hosts include "IO requests," also called "host IOs." Some IO requests direct the SP to read data from an array, whereas other IO requests direct the SP to write data to the array. Also, some IO requests perform block-based data requests, where data are specified by LUN (Logical Unit Number) and offset values, whereas others perform file-based requests, where data are specified using file names and paths. Block-based IO requests typically conform to a block-based protocol, such as Fibre Channel or iSCSI (Internet SCSI, where SCSI is an acronym for Small Computer System Interface), for example. File-based IO requests typically conform to a file-based protocol, such as NFS (Network File System), CIFS (Common Internet File System), or SMB (Server Message Block), for example.

In some data storage systems, an SP may operate one or more virtual data movers. As is known, a virtual data mover is a logical grouping of file systems and servers that is managed by the SP and provides a separate context for managing host data stored on the array. A single SP may provide multiple virtual data movers for different users or groups. For example, a first virtual data mover may organize data for users in a first department of a company, whereas a second virtual data mover may organize data for users in a second department of the company. Each virtual data mover may include any number of host file systems for storing user data.

SUMMARY OF THE INVENTION

In accordance with one aspect of the invention is a method is used in managing migration of virtual file servers. The method migrates a virtual file server from a source storage processor to a destination storage processor in a storage system, where the storage system includes the source and the destination storage processors. The virtual file server comprises a root file system, a configuration file system, and a set of user file systems. The method enables concurrent access to the root file system from both source and destination storage processors during the migration until the set of user file systems is migrated from the source storage processor to the destination storage processor.

In accordance with one aspect of the invention is a system is used in managing migration of virtual file servers. The system migrates a virtual file server from a source storage processor to a destination storage processor in a storage system, where the storage system includes the source and the destination storage processors. The virtual file server comprises a root file system, a configuration file system, and a set of user file systems. The system enables concurrent access to the root file system from both source and destination storage processors during the migration until the set of user file systems is migrated from the source storage processor to the destination storage processor.

In accordance with another aspect of the invention, a computer program product comprising a computer readable medium is encoded with computer executable program code. The code enables execution across one or more processors for managing migration of virtual file servers. The code migrates a virtual file server from a source storage processor to a destination storage processor in a storage system, where the storage system includes the source and the destination storage processors. The virtual file server comprises a root file system, a configuration file system, and a set of user file systems. The code enables concurrent access to the root file system from both source and destination storage processors during the migration until the set of user file systems is migrated from the source storage processor to the destination storage processor.

BRIEF DESCRIPTION OF THE DRAWINGS

Features and advantages of the present technique will become more apparent from the following detailed description of exemplary embodiments thereof taken in conjunction with the accompanying drawings in which:

FIG. 4 is a table showing an example set of records stored in a configuration database that defines a VSP that can be run on the storage processor of FIG. 1, in accordance with an embodiment of the present disclosure.

DETAILED DESCRIPTION OF EMBODIMENT(S)

Figure 1:
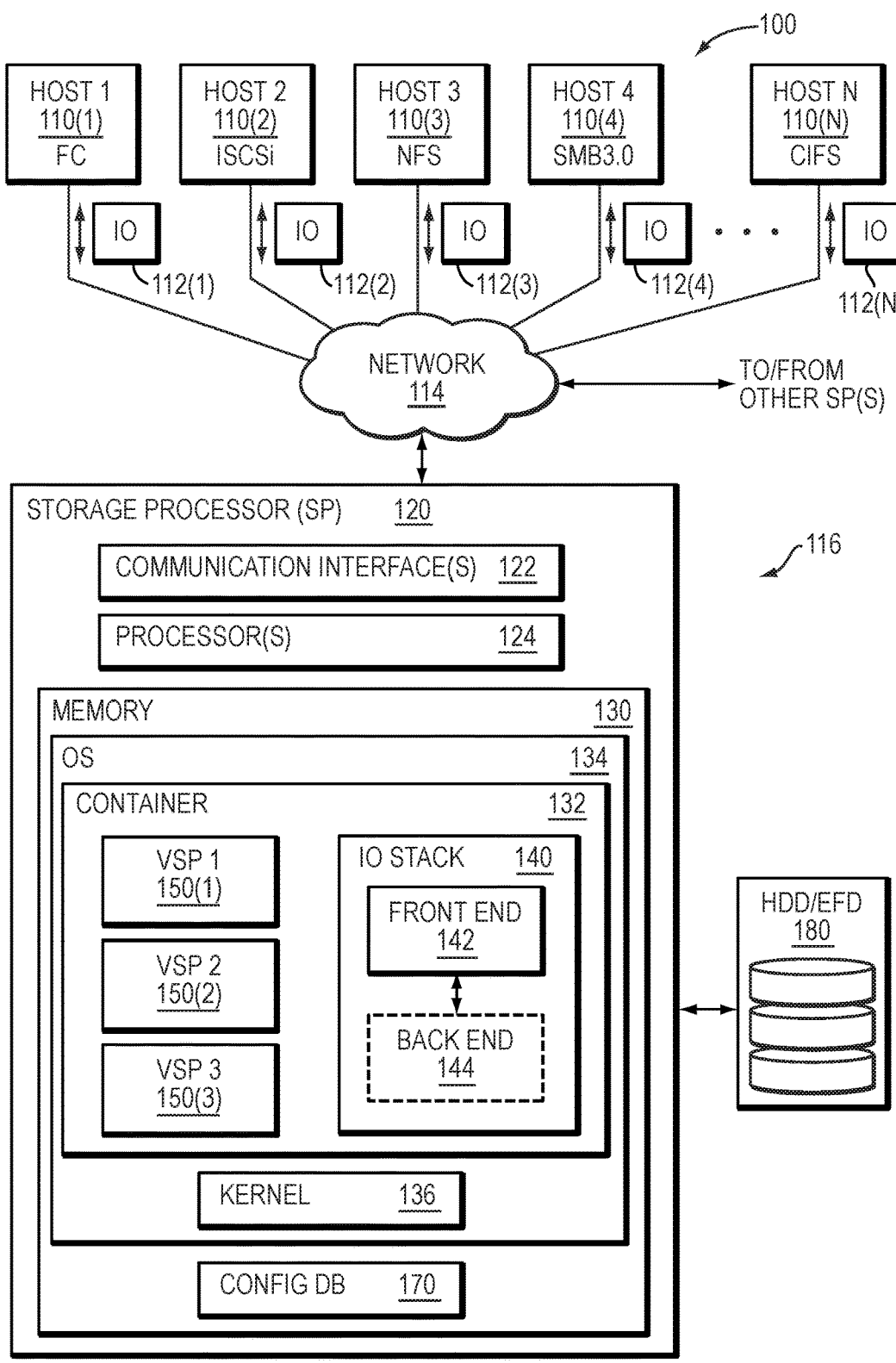
FIG. 1 is a block diagram showing an example data storage apparatus in an environment wherein improved techniques hereof may be practiced, the data storage apparatus including a storage processor having multiple virtualized storage processors (VSPs), in accordance with an embodiment of the present disclosure.

Described below is a technique for use in managing migration of virtual file servers, which technique may be used to provide, among other things, migrating a virtual file server from a source storage processor to a destination storage processor in a storage system, where the storage system includes the source and the destination storage processors, where the virtual file server comprises a root file system, a configuration file system, and a set of user file systems, and enabling concurrent access to the root file system from both source and destination storage processors during the migration until the set of user file systems is migrated from the source storage processor to the destination storage processor.

As described herein, in at least one embodiment of the current technique, a method creates a duplicate set of root file system and configuration file system that are mounted on the destination storage processor. The method enables concurrent access to the root file system for both the source and destination storage processors during the migration of the virtual file server from the source storage processor to the destination storage processor. The method enables parallel unmounting and mounting of user file systems included in a virtual file server, during, for example, reboot, failback, and/or load balancing operations.

Conventional technologies, when migrating a virtual server from a source storage processor of a storage system to a destination storage processor of the storage system, require unmounting each user file system from the source storage processor before the root file system and the configuration file system can be unmounted from the source storage processor. Further, in such a conventional system, the root and configuration file systems need to be mounted to the destination storage processor before any user file system can be mounted to the destination storage processor. Conventional technologies require that the root file system and the configuration file system are available on the source storage processor while the user file systems are being unmounted. Conventional technologies, when bringing a virtual file server online or initializing the virtual file server on a storage processor, first mount the root file system, then mount the configuration file system in a serial fashion. Next, in such a conventional system, the user file systems may be mounted in parallel. Further, in such a conventional system, when a virtual file server is shut down, first the user file systems are unmounted in parallel, then the configuration file system and root file system are unmounted serially. Consequently, when conventional technologies migrate a virtual file server from a source storage processor to a destination storage processor, conventional technologies are limited by the added latency that the serialization of the process incurs, meaning the time it takes to unmount the user file systems in parallel from the source storage processor, unmount the configuration file system and the root file system serially from the source storage processor, mount the root file system and the configuration file system serially on the destination storage processor, and then mount the user file systems in parallel on the destination storage processor because the root and the configuration file systems need to be available on the destination storage processor before any user file system can be mounted on the destination storage processor and the root and the configuration file systems also need to be available on the source storage processor while unmounting of user file systems is still in progress. Thus, in such a conventional system, there exists a dependency on the root and configuration file systems on both source and destination storage processors thereby restricting concurrent access or operations across both source and destination storage processors. Consequently, in such a conventional system, this adds to the time the data is unavailable during a reboot, failback or load balancing operations.

By contrast, in at least some implementations in accordance with the current technique as described herein, migrating a virtual file server from a source storage processor to a destination storage processor in a storage system, where the storage system includes the source and the destination storage processors, where the virtual file server comprises a root file system, a configuration file system, and a set of user file systems, and enabling concurrent access to the root file system from both source and destination storage processors during the migration until the set of user file systems is migrated from the source storage processor to the destination storage processor.

Thus, in at least one embodiment of the current technique, by providing a duplicate set of root file system and configuration file system for a virtual file server on both the source and destination storage processors of a storage system, the current method renders the root and configuration file systems accessible on the destination storage processor for the mounting of the user file systems on the destination storage processor before the virtual file server has completed the unmounting (also referred to herein as "unloading") process on the source storage processor.

Thus, the goal of the current technique is to provide a method and a system for managing migration of virtual file servers, and in a timely manner, in order to reduce the amount of time data is unavailable whenever a virtual file server is unloaded from one storage processor and loaded onto another storage processor during an event such as a reboot, failback, and/or load balancing operations and for any other purposes.

In at least some implementations in accordance with the current technique described herein, the use of managing migration of virtual file servers technique can provide one or more of the following advantages: minimizing data unavailable time during reboot, failback, and/or load balancing operations within a storage system, and improving the time it takes to migrate virtual file serves by providing parallel mounting and unmounting across storage processors. Further, any software defined file server software, product, or solution that allows migration of multiple file system across nodes in a set can utilize the current technique to efficiently migrate file systems.

In contrast to conventional technologies, in at least some implementations in accordance with the current technique as described herein, a method manages migration of virtual file servers. The method migrates a virtual file server from a source storage processor to a destination storage processor in a storage system. The storage system includes the source and the destination storage processors. The virtual file server comprises a root file system, a configuration file system, and a set of user file systems. The method enables enabling concurrent access to the root file system from both source and destination storage processors during the migration until the set of user file systems is migrated from the source storage processor to the destination storage processor.

In an example embodiment of the current technique, the migration of virtual file server from the source storage processor to the destination storage processor occurs upon occurrence of at least one of events, the events including a reboot, a failback, and a load balancing.

In an example embodiment of the current technique, the method updates access permission for the root file system and the configuration file system mounted on the source storage processor to a read-only access mode. The method mounts the root file system and the configuration file system on the destination storage processor in the read-only access mode.

In an example embodiment of the current technique, the method unmounts the set of user file systems from the source storage processor. The method mounts the set of user file systems on the destination storage processor under the root file system made accessible concurrently on the destination storage processor.

In an example embodiment of the current technique, the method unmounts the root file system and the configuration file system from the source storage processor upon unmounting of each user file system of the set of user file systems from the source storage processor. The method updates access permission for the root file system and the configuration file system mounted on the destination storage processor to a read-write access mode.

In an example embodiment of the current technique, the method disallows any configuration changes for the virtual file server until the virtual file server is migrated from the source storage processor to the destination storage processor.

In an example embodiment of the current technique, the method creates a replica of the root file system and a replica of the configuration file system. The method mounts the replicas of root file system and the configuration file system on the destination storage processor in the read-write access mode. The method marks the root file system and the configuration file system mounted on the source storage processor for deletion at a later time.

In an example embodiment of the current technique, the method unmounts the root file system and the configuration file system from the source storage processor upon unmounting of each user file system of the set of user file systems from the source storage processor. The method deletes the root file system and the configuration file system mounted on the source storage processor.

In an example embodiment of the current technique, the method transfers ownership of a set of network interfaces associated with the virtual file server from the source storage processor to the destination storage processor upon availability of the root file system and the configuration file system on the destination storage processor.

Referring now to FIG. 1, shown is an example environment 100 in which embodiments of the improved technique hereof can be practiced. Here, multiple host computing devices ("hosts") 110(1) through 110(N), access a data storage apparatus 116 over a network 114. The data storage apparatus 116 includes a physical storage processor, or "SP," 120 and storage 180. The storage 180 is provided, for example, in the form of hard disk drives and/or electronic flash drives. Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network, such as, for example, a storage area network (SAN), local area network (LAN), wide area network (WAN), the Internet, some other type of network, and/or any combination thereof. In an example, the hosts 110(1-N) connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) in transmissions from the hosts 110(1-N) according to both block-based and file-based protocols and to respond to such IO requests 112(1-N) by reading or writing the storage 180.

The SP 120 is seen to include one or more communication interfaces 122, control circuitry (e.g., a set of processors 124), and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 are constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 is further seen to include a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can be run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140 and multiple virtualized file server (also referred to herein as Virtual Data Mover (VDMs) 150(1-3). The IO stack 140 provides an execution path for host IOs (e.g., 112(1-N)) and includes a front end 142 and a back end 144. The VDMs 150(1-3) each run within the container 132 and provide a separate context for managing host data. In an example, each VDM manages a respective set of host file systems and/or other data objects and uses servers and settings for communicating over the network 114 with its own individual network identity. Although three VDMs are shown, it is understood that the SP 120 may include as few as one VDM or as many VDMs as the computing resources of the SP 120 and storage resources of the storage 180 allow.

Although the VDMs 150(1-3) each present an independent and distinct identity, it is evident that the VDMs 150(1-3) are not, in this example, implemented as independent virtual machines. Rather, all VDMs 150(1-3) operate in userspace and employ the same kernel 136 of the SP 120. Although it is possible to implement the VDMs 150(1-3) as independent virtual machines (each including a virtualized kernel), it has been observed that VDMs perform faster when the kernel 136 is not virtualized.

Also, it is observed that the VDMs 150(1-3) all run within the container 132, i.e., within a single userspace instance. Again, the arrangement shown reflects a deliberate design choice aimed at optimizing VDM performance. It is understood, though, that alternative implementations could provide different VDMs in different containers, or could be provided without containers at all.

The memory 130 is further seen to store a configuration database 170. The configuration database 170 stores system configuration information, including settings related to the VDMs 150(1-3) and their data objects. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing.

At the front end 142 of the IO stack 140, processing includes associating each of the IO requests 112(1-N) with a particular one of the VDMs 150(1-3). In an example, each VDM stores a network address (e.g., an IP address) in a designated location within its file systems. The front end 142 identifies the network address to which each IO request is directed and matches that address with one of the network addresses stored with the VDMs 150(1-3). The front end 142 thus uses the network address to which each IO request is sent to identify the VDM to which the IO request is directed. Further processing of the IO request is then associated (e.g., tagged) with an identifier of the matching VDM, such that the IO request is processed within a particular VDM context. Any data logging, metrics collection, fault reporting, or messages generated while the IO request is being processed are stored with the associated VDM (e.g., in a file system dedicated to the VDM). Also, any path information provided with the IO request (e.g., to a particular directory and file name) is interpreted within the namespace of the identified VDM.

Processing within the front end 142 may further include caching data provided with any write IOs and mapping host data objects (e.g., host file systems, LUNs, vVols, VMDKs, etc.) to underlying files stored in a set of internal file systems. Host IO requests received for reading and writing both file systems and LUNs are thus converted to reads and writes of respective files. The IO requests then propagate to the back end 144, where commands are executed for reading and/or writing the physical storage 180.

In an example, processing through the IO stack 140 is performed by a set of threads maintained by the SP 120 in a set of thread pools. When an IO request is received, a thread is selected from the set of thread pools. The IO request is tagged with a VDM identifier, and the selected thread runs with the context of the identified VDM. Typically, multiple threads from different thread pools contribute to the processing of each IO request (there are many processing layers). Multiple threads from the thread pools can process multiple IO requests simultaneously, i.e., in parallel, on the data objects of any one VDM or multiple VDMs.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends. In all arrangements, processing through both the front end 142 and back end 144 is preferably tagged with the particular VDM context such that the processing remains VDM-aware.

Typically, a file server (also referred to herein as a data mover) is a component that runs its own operating system which retrieves data from a storage device and makes it available to a client or host in communication with the file server. Thus, a file server is a gateway to present network-attached storage to end-users. The file server can use various protocols such as NFS, CIFS and pNFS protocols. A virtual file server (also referred to herein as VDM) is software feature that enables the grouping of CIFS and/or NFS and servers into virtual containers. Each VDM stores its configuration information in its respective VDM root file system. VDMs include the data needed to support one or more CIFS and/or NFS servers and their user file systems. Each VDM has access only to the file systems mounted to that VDM, providing a logical isolation between other VDMs on a storage system. When a VDM is created, a root file system is created for that VDM. Generally, only one root file system is created per VDM. This is the file system that stores the CIFS and/or NFS identity information. User file systems are mounted to mount points created on the VDM root file system, and user data is kept in those user file systems. VDM allows replicating or moving CIFS and/or NFS environment to another local or remote storage system. VDMS also support disaster recovery by isolating and securing independent CIFS and/or NFS server configuration on the same storage system which means one does not have to reboot the entire storage system but can pick and choose which VDM to reboot. Accessing data from a VDM is no different from accessing data that resides on a physical file server. The VDM acts as a container that includes the file systems exported by the NFS endpoint or the CIFS server, or both. These file systems on the VDM are visible through a subset of the file server network interfaces attached to the VDM. The same network interface can be shared by both CIFS and NFS protocols on that VDM.

Figure 2:
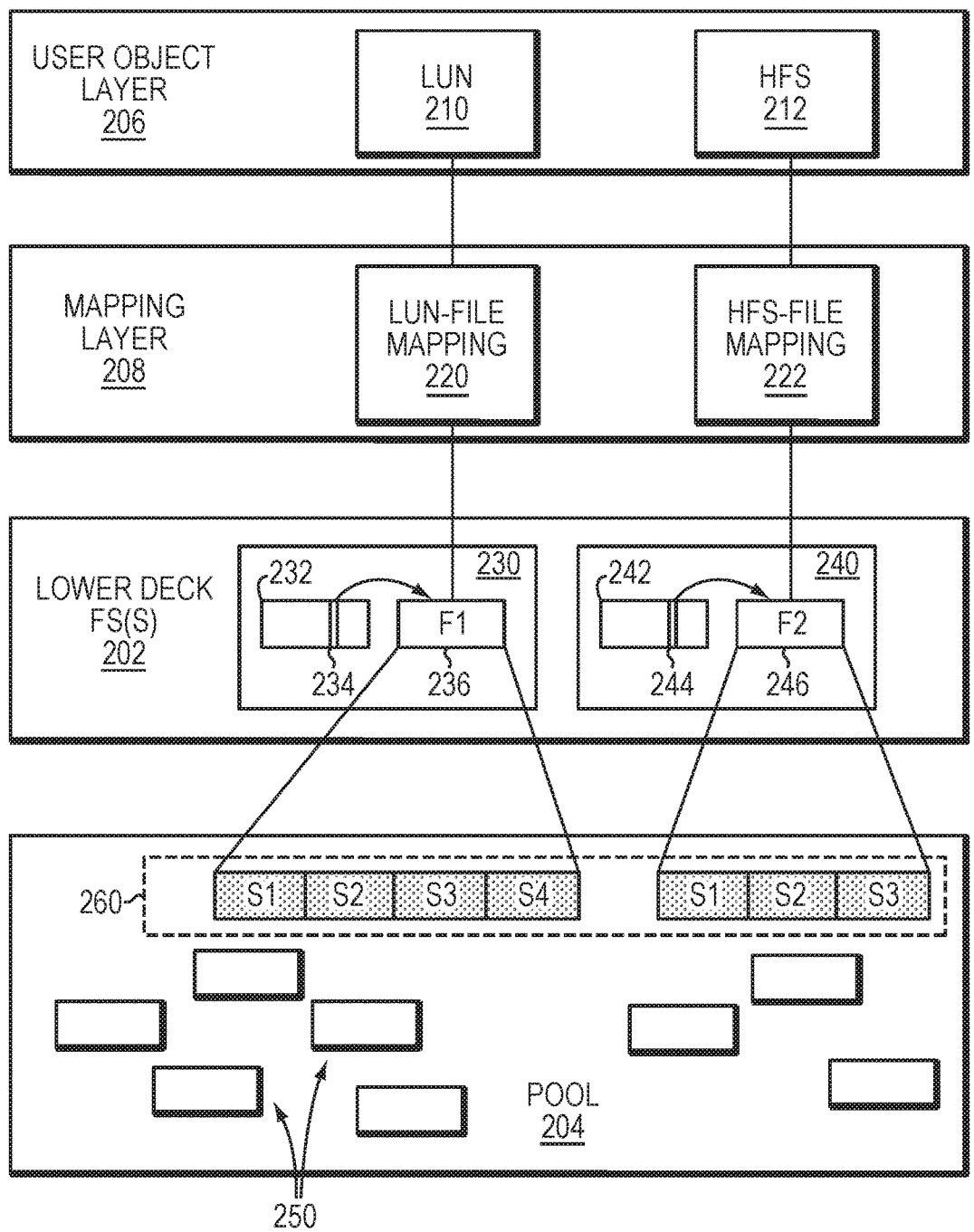
FIG. 2 is a block diagram showing example features of the front end of FIG. 1 in additional detail, in accordance with an embodiment of the present disclosure.

FIG. 2 shows portions of the front end 142 in additional detail. Here, and describing the architecture generally without regard to any particular VDM, it is seen that a set of lower-deck file systems 202 represents LUNs and host file systems in the form of files. Any number of lower-deck file systems 202 may be provided. In one arrangement, a single lower-deck file system may include, as files, any number of LUNs and/or host file systems, as well as their snaps (i.e., point-in-time copies). In another arrangement, a different lower-deck file system is provided for each primary object to be stored, e.g., for each LUN and for each host file system. Additional arrangements provide groups of host file systems and/or groups of LUNs together in a single lower deck file system. The lower-deck file system for any object may include a file storing the object itself, as well as files storing any snaps of the object. Each lower-deck file system 202 has an inode table (e.g., 232, 242), which provides a unique inode for each file stored in the lower-deck file system. The inode table of each lower-deck file system stores properties of each file in the respective lower-deck file system, such as ownership and block locations at which the file's data are stored. Lower-deck file systems are built upon storage elements managed by a storage pool 204.

The storage pool 204 organizes elements of the storage 180 in the form of slices. A "slice" is an increment of storage space, such as 256 MB in size, which is obtained from the storage 180. The pool 204 may allocate slices to lower-deck file systems 202 for use in storing their files. The pool 204 may also deallocate slices from lower-deck file systems 202 if the storage provided by the slices is no longer required. In an example, the storage pool 204 creates slices by accessing RAID groups formed from the storage 180, dividing the RAID groups into FLUs (Flare LUNs), and further dividing the FLU's into slices.

Continuing with reference to the example shown in FIG. 2, a user object layer 206 includes a representation of a LUN 210 and of an HFS (host file system) 212, and a mapping layer 208 includes a LUN-to-file mapping 220 and an HFS-to-file mapping 222. The LUN-to-file mapping 220 maps the LUN 210 to a first file F1 (236), and the HFS-to-file mapping 222 maps the HFS 212 to a second file F2 (246). Through the LUN-to-file mapping 220, any set of blocks identified in the LUN 210 by a host IO request is mapped to a corresponding set of blocks within the first file 236. Similarly, through the HFS-to-file mapping 222, any file or directory of the HFS 212 is mapped to a corresponding set of blocks within the second file 246. The HFS 212 is also referred to herein as an "upper-deck file system," which is distinguished from the lower-deck file systems 202, which are for internal use.

In this example, a first lower-deck file system 230 includes the first file 236 and a second lower-deck file system 240 includes the second file 246. Each of the lower-deck file systems 230 and 240 includes an inode table (232 and 242, respectively). The inode tables 232 and 242 provide information about files in respective lower-deck file systems in the form of inodes. For example, the inode table 232 of the first lower-deck file system 230 includes an inode 234, which provides file-specific information about the first file 236. Similarly, the inode table 242 of the second lower-deck file system 240 includes an inode 244, which provides file-specific information about the second file 246. The information stored in each inode includes location information (e.g., block locations) where the respective file is stored, and may thus be accessed as metadata to identify the locations of the files 236 and 246 in the storage 180.

Although a single file is shown for each of the lower-deck file systems 230 and 240, it is understood that each of the lower-deck file systems 230 and 240 may include any number of files, each with its own entry in the respective inode table. In one example, each lower-deck file system stores not only the file F1 or F2 for the LUN 210 or HFS 212, but also snaps of those objects. For instance, the first lower-deck file system 230 stores the first file 236 along with a different file for every snap of the LUN 210. Similarly, the second lower-deck file system 240 stores the second file 246 along with a different file for every snap of the HFS 212.

As shown, a set of slices 260 is allocated by the storage pool 204 for storing the first file 236 and the second file 246. In the example shown, slices S1 through S4 are used for storing the first file 236, and slices S5 through S7 are used for storing the second file 246. The data that make up the LUN 210 are thus stored in the slices S1 through S4, whereas the data that make up the HFS 212 are stored in the slices S5 through S7.

In some examples, each of the lower-deck file systems 230 and 240 is associated with a respective volume, such as a sparse LUN. Sparse LUNs provide an additional layer of mapping between the lower-deck file systems 202 and the pool 204 and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file system" to refer to a construct similar to the lower-deck file system disclosed herein.

Although the example of FIG. 2 shows storage of a LUN 210 and a host file system 212 in respective lower-deck file systems 230 and 240, it is understood that other data objects may be stored in one or more lower-deck file systems in a similar manner. These may include, for example, file-based vVols, block-based vVols, and VMDKs.

Figure 3:
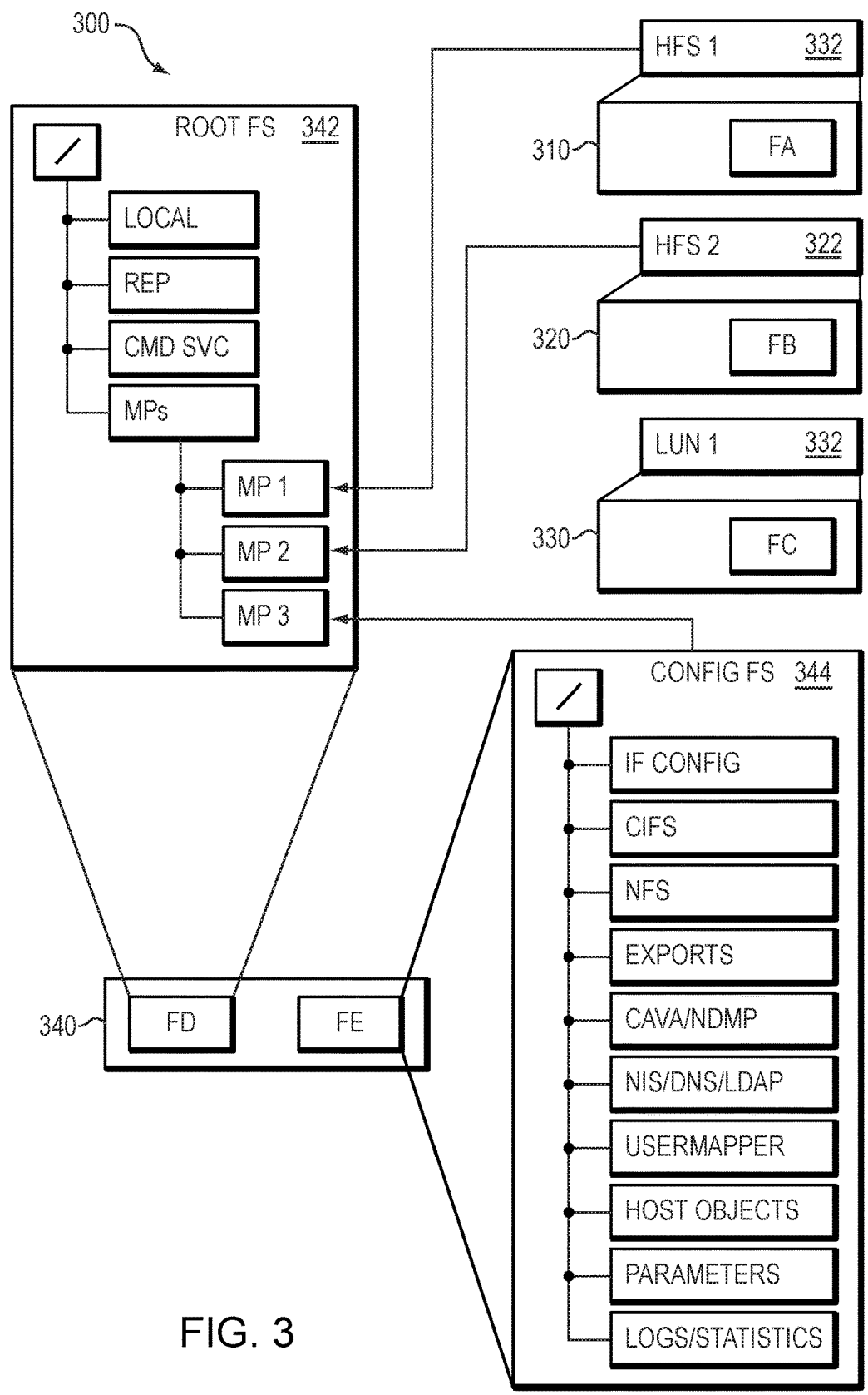
FIG. 3 is a block diagram showing an example set of file systems of a VSP of FIG. 1, in accordance with an embodiment of the present disclosure.

FIG. 3 shows an example set of components of the data storage apparatus 116 that are associated with a particular VDM 300 (i.e., any of the VDMs 150(1-3)). The components shown in FIG. 3 include components that are managed in the context of the VDM 300 and components that form the "personality" of the VDM 300. These components may be referred to herein as "included" within the VDM 300, by which it is meant that the components are associated with the VDM 300 within the data storage apparatus 116 and are not associated with any other VDM. It is thus seen that the VDM 300 "includes" a number of lower-deck file systems hosting various host data objects, as well as internal data objects.

For example, the VDM 300 includes a first lower-deck file system 310 and a second lower-deck file system 320. The first lower-deck file system 310 includes a file FA, which provides a file representation of a first host file system 312 (also referred to herein as "user file system"). Similarly, the second lower-deck file system 320 includes a file FB, which provides a file representation of a second host file system 322. The host file systems 312 and 322 are upper-deck file systems, which may be made available to hosts 110(1-N) for storing file-based host data. HFS-to-file mappings, like the HFS-to-file mapping 222, are understood to be present (although not shown in FIG. 3) for expressing the files FA and FB in the form of upper-deck file systems. Although only two host file systems 312 and 322 are shown, it is understood that the VDM 300 may include any number of host file systems (also referred to herein as "user file systems"). In an example, a different lower-deck file system is provided for each host file system. The lower-deck file system stores the file representation of the host file system, and, if snaps are turned on, any snaps of the host file system. In a similar manner to that described in connection with FIG. 2, each of the lower-deck file systems 310 and 320 includes a respective inode table, allowing the files FA and FB and their snaps to be indexed within the respective lower-deck file systems and accessed within the storage 180.

In some examples, the VDM 300 also includes one or more lower-deck file systems for storing file representations of LUNs. For example, a lower-deck file system 330 stores a file FC, which provides a file representation of a LUN 332. A LUN-to-file mapping (not shown but similar to the mapping 320) expresses the file FC in the form of a LUN, which may be made available to hosts 110(1-N) for storing block-based host data. In an example, the lower-deck file system 330 stores not only the file FC, but also snaps thereof, and includes an inode table in essentially the manner described above.

The VDM 300 further also includes a lower-deck file system 340. In an example, the lower-deck file system 340 stores file representations FD and FE of two internal file systems of the VDM 300—a root file system 342 and a configuration file system 344. In an alternative arrangement, the files FD and FE are provided in different lower-deck file systems. In an example, the lower-deck file system 340 also stores snaps of the files FD and FE, and files are accessed within the lower-deck file system 340 via file system-to-file mappings and using an inode table, substantially as described above.

In an example, the root file system 342 has a root directory, designated with the slash ("/"), and sub-directories as indicated. Any number of sub-directories may be provided within the root file system in any suitable arrangement with any suitable file structure; the example shown is merely illustrative. As indicated, one sub-directory ("Local") stores, for example, within constituent files, information about the local environment of the SP, such as local IP sub-net information, geographical location, and so forth. Another sub-directory ("Rep") stores replication information, such as information related to any ongoing replication sessions. Another sub-directory ("Cmd Svc") stores command service information, and yet another sub-directory ("MPs") stores mount points.

In the example shown, the directory "MPs" of the root file system 342 provides mount points (e.g., directories) on which file systems are mounted. For example, the host file systems 312 and 322 are respectively mounted on mount points MP1 and MP2, and the configuration file system 344 is mounted on the mount point MP3. In an example, establishment of the mount points MP1-MP3 and execution of the mounting operations for mounting the file systems 312, 322, 344 onto the mount points MP1-MP4 are provided in a batch file stored in the configuration file system 344 (e.g., in Host Objects). It is understood that additional mount points may be provided for accommodating additional file systems.

The root file system 342 has a namespace, which includes the names of the root directory, sub-directories, and files that belong to the root file system 342. The file systems 312, 322, and 344 also each have respective namespaces. The act of mounting the file systems 312, 322, and 344 onto the mount points MP1, MP2, and MP3 of the root file system 342 serves to join the namespace of each of the file systems 312, 322, and 344 with the namespace of the root file system 342, to form a single namespace that encompasses all the file systems 312, 322, 342, and 344. This namespace is specific to the VDM 300 and is independent of namespaces of any other VDMs.

Also, it is understood that the LUN 332 is also made available to hosts 110a-n through the VDM 300. For example, hosts 110a-n can send read and write IO requests to the LUN 332 (e.g., via Fibre Channel and/or iSCSI commands) and the SP 120 services the requests for the VDM 300, e.g., by operating threads tagged with the context of the VDM 300. Although FIG. 3 shows both the LUN 322 and the host file systems 312 and 322 together in a single VDM 300, other examples may provide separate VDMs for LUNs and for file systems.

Although the VDM 300 is seen to include file systems and LUNs, other host objects may be included, as well. These include, for example, file-based vVols, block-based vVols, and VMDKs. Such host objects may be provided as file representations in lower-deck file systems and made available to hosts 110a-n.

As its name suggests, the configuration file system 344 stores configuration settings for the VDM 300. These settings include settings for establishing the "personality" of the VDM 300, i.e., the manner in which the VDM 300 interacts over the network 114. Although the configuration file system 344 is shown with a particular directory structure, it is understood that any suitable directory structure can be used. In an example, the configuration file system 344 stores the following elements:

IF Config.

Interface configuration settings of any network interface used for processing IO requests and tagged with a context of the VDM 300. IF Config includes the IP address of the VDM, as well as related network information, such as sub-masks and related IP information.

CIFS.

Configuration settings and names of one or more CIFS servers used in the context of the VDM 300. The CIFS servers manage IO requests provided in the CIFS protocol. By including the CIFS configuration within the configuration file system 344, the CIFS configuration becomes part of the VDM 300 itself and remains with the VDM 300 even as the VDM 300 is moved from one SP to another SP. This per-VDM configuration of CIFS also permits each VDM to have its own customized CIFS settings, which may be different from the settings of CIFS servers used by other VDMs.

NFS.

Configuration settings and names of one or more NFS servers used in the context of the VDM 300. The NFS servers manage IO requests provided in the NFS protocol. By including the NFS configuration within the configuration file system 344, the NFS configuration becomes part of the VDM 300 itself and remains with the VDM 300 even as the VDM 300 is moved from one SP to another SP. This per-VDM configuration of NFS also permits each VDM to have its own customized NFS settings, which may be different from the settings of NFS servers used by other VDMs.

Exports.

NFS exports, CIFS shares, and the like for all supported protocols. For security and management of host access, users are typically given access only to specified resources mounted to the root file system 342, e.g., host file systems, sub-directories of those file systems, and/or particular LUNs. Access to these resources is provided by performing explicit export/share operations, which expose entry points to the resources for host access. In an example, these export/share operations are included within one or more batch files, which may be executed when the VDM 300 is started. Exports are typically VDM-specific, and depend upon the particular data being hosted and the access required.

CAVA/NDMP:

CAVA (Celerra Anti-Virus Agent) configuration file, including location of external server for performing virus checking operations. NDMP (Network Data Management Protocol) provides backup configuration information. CAVA and NDMP settings are configurable on a per-VDM basis.

NIS/DNS/LDAP:

Local configurations and locations of external servers for providing resolution of IP addresses. NIS (Network Information Service), DNS (Directory Name System), and LDAP (Lightweight Directory Access Protocol) settings are configurable on a per-VDM basis. The DNS configuration stores local host name and domain name of the VDM 300, as well as the location of a DNS server for resolving host names.

Host Objects:

Identifiers for all host file systems (e.g., 312 and 322), LUNs (e.g., LUN 332), and other host objects included within the VDM 300. Host objects may also include batch files and/or lists of instructions for establishing mount points in the root file system 342 and for mounting the host file system(s) and LUN(s) to the mount points.

Parameters:

Low-level settings (e.g., registry settings) for configuring VDM 300. These include cache settings and settings for specifying a maximum number of threads running on the SP 120 that may be used to service IO requests within the context of the VDM 300. Parameters are configurable on a per-VDM basis.

Statistics:

Metrics, log files, and other information pertaining to activities within the context of the VDM 300. Statistics are updated as they accumulate.

Many configuration settings are established at startup of the VDM 300. Some configuration settings are updated as the VDM 300 is operated. The configuration file system 344 preferably does not store host data.

Although FIG. 3 has been shown and described with reference to a particular VDM 300, it is understood that all of the VDMs 150(1-3) may include a root file system, a configuration file system, and at least one host file system or LUN, substantially as shown. Particular host objects and configuration settings differ, however, from one VDM to another.

By storing the configuration settings of VDMs within the file systems of the VDMs themselves and providing a unique namespace for each VDM, VDMs are made to be highly independent, both of other VDMs and of the particular SPs on which they are provided. For example, migrating a VDM from a first data storage system to a second data storage system involves maintaining replicas of its lower-deck file systems (or some subset thereof) from a source SP on the first data storage system to a target SP on the second, starting the VDM's servers on the target SP in accordance with the configuration settings, and resuming operation on the target SP. As the paths for accessing data objects on VDMs are not rooted to the SPs on which they are run, hosts may often continue to access migrated VDMs using the same instructions as were used prior to moving the VDMs. Similar benefits can be enjoyed when moving a VDM from one SP to another SP in the same data storage system. To move a VDM from a first SP to a second SP within the same storage system, the VDM need merely be shut down (i.e., have its servers stopped) on the first SP and resumed (i.e., have its servers started up again) on the second SP.

FIG. 4 shows an example record 400 of the configuration database 170, which are used to define a particular VDM having a VDM identifier (ID) 410. The VDM ID 410 may identify one of the VDMs 150(1-3) or some other VDM of the data storage apparatus 116. The record 400 specifies, for example, an owning SP (physical storage processor), authentication, and identifiers of the data objects associated with the listed VDM. The data object identifiers include identifiers of the root file system, configuration file system, and various host file systems (or other host objects) that may be accessed in the context of the listed VDM. The record 400 may also identify the lower-deck file system used to store each data object. The record 400 may further specify host interfaces that specify IO protocols that the listed VDM is equipped to handle.

Although FIG. 4 shows only a single record 400 for a single VDM, it is understood that the configuration database 170 may store records, like the record 400, for any number of VDMs, including all VDMs of the data storage apparatus 116. During start-up of the data storage apparatus 116, or at some other time, a computing device of the data storage apparatus 116 reads the configuration database 170 and launches a particular VDM or a group of VDMs on the identified SPs. As a VDM is starting, the SP that owns the VDM reads the configuration settings of the configuration file system 344 to configure the various servers of the VDM and to initialize its communication protocols. The VDM may then be operated on the identified SP, i.e., the SP may then be operated with the particular VDM's context.

It is understood that VDMs 150(1-3) operate in connection with the front end 142 of the IO stack 140. The VDMs 150(1-3) thus remain co-located with their respective front ends 142 in modular and gateway arrangements.

Figure 5:
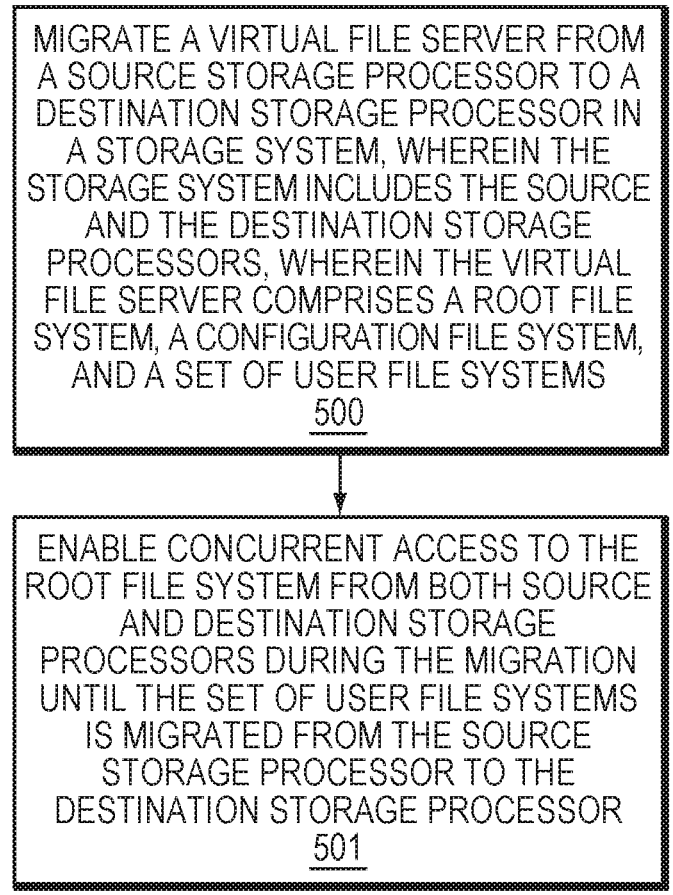
FIG. 5 is a flow diagram illustrating processes that may be used in connection with techniques disclosed herein.

Referring to FIG. 5, shown is a more detailed flow diagram illustrating managing migration of virtual file servers. With reference also to FIGS. 1-4, the method migrates a virtual file server from a source storage processor to a destination storage processor in a storage system (Step 500). The storage system includes the source and the destination storage processors. The virtual file server comprises a root file system, a configuration file system, and a set of user file systems. Typically, when the virtual file server is brought online, first the root file system is mounted, then the configuration file system is mounted after the root file system is mounted. Once the configuration file system is mounted, the set of user file systems is mounted in parallel. Using conventional technologies, the root file system, the configuration file system, and the user file systems are mounted serially. Likewise, when the virtual file server is shut down, using conventional technologies, first the user file systems are unmounted in parallel, then the configuration file system is unmounted, and then the root file system is unmounted. Embodiments disclosed herein enable concurrent access to the root file system from both source and destination storage processors during the migration until the set of user file systems is migrated from the source storage processor to the destination storage processor (Step 501).

In an example embodiment, the migration of virtual file server from the source storage processor to the destination storage processor occurs upon occurrence of at least one of a reboot, a failback, and a load balancing. In the case of a reboot, the source storage processor may have been restated for any number of reasons. Generally, a reboot of a storage processor in a storage system may trigger a process that may cause unloading of a virtual file server from the source storage processor causing unmounting of user file systems, and root and configuration file systems of such virtual file server. If the virtual file server contains a large number of user files, in a conventional system, it may take a long time before access to data may be restored for clients connected to the virtual file server.

Further, in such an example, when a storage processor that rebooted and become operational and functional at a later time, it may again trigger the migration of the virtual file server from one storage processor to another storage processor.

Further, in order to increase efficiency of IO operations and/or IO workload within a storage system, the storage system may perform load balancing by migrating a set of virtual file servers from one storage processor to another storage processor within the storage system.

In this example scenario, conventional technologies don't enable any file systems to be mounted on the target storage processor until all of the file systems are unmounted from the source storage processor. In contrast, embodiments disclosed herein provide advantages over conventional technologies by making a root file system and the configuration file system available as soon as possible on the destination storage processor such that file systems on the source storage processor may be unmounted in parallel and concurrently mounted on the destination storage processor. During a load balancing, embodiments disclosed herein provide advantages over conventional technologies by removing the requirement of serially unmounting (also referred to herein as "unloading") the root and configuration file systems on the source storage processor and then serially mounting ("also referred to herein as "loading") the root and configuration file systems on the destination storage processor. Instead, the destination storage processor is available for mounting user file systems of a virtual file server as soon as the root file system and configuration file system for the virtual file server are made available on the destination storage processor by maintaining a replica of the root and configuration file systems and making such replicas available on the destination storage processor. During a failback operation, a storage processor, for example, storage processor "A", may have encountered a problem, and recovered. In this example scenario, files that were mounted on a second storage processor, for example, storage processor "B" (i.e., the source storage processor), are unmounted and mounted back onto storage processor "A" (i.e., the destination storage processor).

In an example embodiment, the method updates access permission for the root file system and the configuration file system mounted on the source storage processor to a read-only access mode. In an example embodiment, the method performs a remount operation on the root file system and the configuration file system in read-only mode.

In an example embodiment, the method unmounts the set of user file systems from the source storage processor. The method mounts the set of user file systems on the destination storage processor under the root file system made accessible concurrently on the destination storage processor. In an example embodiment, the root file system and the configuration file system are mounted on the destination storage processor in read-only mode. In an example embodiment, as soon as the method unmounts the set of user file systems from the source storage processor, the set of user file systems may be mounted on the destination storage processor, without having to wait for the root file system and the configuration file system to finish unmounting from the source storage processor. It should be noted that under the current technique, as soon as one user file system from the set of user file systems is unmounted from the source storage processor, it can be mounted on the destination storage processor without having to wait for unmounting of rest of the user file systems of the set of user file systems from the source storage processor, In other words, as soon as each file system of the set of user file systems is unmounted from the source storage processor, that file system is mounted on the destination storage processor and becomes available on the destination storage processor. This allows the virtual file server to become available on the destination storage processor much faster, and minimizes the time the data associated with the set of user file systems is unavailable.

In an example embodiment, the method unmounts the root file system and the configuration file system from the source storage processor upon unmounting of each user file system of the set of user file systems from the source storage processor. The method updates access permission for the root file system and the configuration file system mounted on the destination storage processor to a read-write access mode. In other words, once the set of user file systems have been unmounted from the source storage processor, the method unmounts the root file system and the configuration file system from the source storage processor. The root file system and configuration file system that are already mounted on the destination storage processor in read-only mode are then updated to read-write mode. In an example embodiment, the method disallows any configuration changes for the virtual file server until the virtual file server is migrated from the source storage processor to the destination storage processor. In an example embodiment, the method disallows any configuration changes to the virtual file server from the time the root and configuration file systems are mounted in read-only mode on the source storage processor until the root and configuration file systems are mounted in read-write mode on the destination storage processor.

Thus, as described above herein, in at least one embodiment, the current method introduces parallelism in the unloading ("stopping") of a virtual file server from a source storage processor to loading ("restarting") of the virtual file server on a destination storage processor (also referred to herein as "migration of a virtual file server") by making root and configuration file systems of the virtual file server available on both storage processors during this migration. In such a case, the root and configuration file systems remain in read-only access mode during this migration and respective duplicate copies of the root and configuration file systems are created and made available on the destination storage processor.

Alternatively, as described below herein, in another embodiment, the current method makes root and configuration file systems of a virtual file server available on a destination storage processor during migration of the virtual file server from a source storage processor by creating respective replica copies of the root and configuration file systems and making such replicas available on the destination storage processor during the migration of the virtual file server. In such embodiment, when a virtual file server needs to be unloaded from a source storage processor, any updates to the virtual file server on the source storage processor are disallowed. A replica of the root file system and a replica of the configuration file system of the virtual file server are created and mounted on a destination storage processor in a read-write access mode. The root and configuration file systems mounted on the source storage processor are marked for deletion at a later time. A set of user file systems are unmounted from the source storage processor and mounted under the root file system made available on the destination storage processor. Once, each user file system is unmounted from the source storage processor, the root and configuration file systems are unmounted on the source storage processor and deleted from the source storage processor.

In an example embodiment, as described above herein, the method creates a replica (i.e., point-in-time copy, also referred to herein as "snap") of the root file system and a replica of the configuration file system. The method mounts the replicas of root file system and the configuration file system on the destination storage processor in the read-write access mode. Thus, in this example embodiment, as soon as the destination storage processor is identified for migration, the replicas of the root file system, and the configuration file system are mounted on the destination storage processor in read-write access mode, and transfer of the user file systems may begin. Further, the method marks the root file system and the configuration file system mounted on the source storage processor for deletion at a later time. In an example embodiment, the replicas may be established or maintained using synchronous and/or asynchronous volume based replication. In this example embodiment, during a failback operation, the root file system and the configuration file system are mounted on the source storage processor in read-only access mode. The replicated root file system and the configuration file system are mounted on the destination storage processor in read-write access mode, and the replication process is reversed.

In an example embodiment, the method unmounts the root file system and the configuration file system from the source storage processor upon unmounting of each user file system of the set of user file systems from the source storage processor. The method deletes the root file system and the configuration file system mounted on the source storage processor. In an example embodiment, when the method creates a replica root file system and a replica configuration file system for mounting onto the destination storage processor, the method deletes the root file system and the configuration file system from the source storage processor once each of the user file systems have been unmounted from the source storage processor.

In an example embodiment, the method transfers ownership of a set of network interfaces associated with the virtual file server from the source storage processor to the destination storage processor upon availability of the root file system and the configuration file system on the destination storage processor. In an example embodiment, when the set of network interfaces comprises one network interface, the method may transfer ownership of the network interface as soon as I/O operations are no longer being sent to the source storage processor. In another example embodiment, when the set of network interfaces includes more than one network interface, the method may transfer ownership of the network interfaces in phases.

There are several advantages to embodiments disclosed herein. For example, the method provides for parallel mounting and unmounting across storage processors. The method minimizes the time the data is unavailable during reboot, failback and/or load balancing. The method decreases the amount of time to complete reboot, failback, and/or load balancing.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing migration of virtual file servers, the method comprising:
    migrating a virtual file server from a source storage processor to a destination storage processor in a storage system, wherein the storage system includes the source and the destination storage processors, wherein the virtual file server comprises a root file system, a configuration file system, and a set of user file systems; and
    enabling concurrent access to the root file system from both source and destination storage processors during the migration until the set of user file systems is migrated from the source storage processor to the destination storage processor.

2. The method of claim 1, wherein the migration of virtual file server from the source storage processor to the destination storage processor occurs upon occurrence of at least one of events, the events including a reboot, a failback, and a load balancing.

3. The method of claim 1, further comprising:
    updating access permission for the root file system and the configuration file system mounted on the source storage processor to a read-only access mode; and
    mounting the root file system and the configuration file system on the destination storage processor in the read-only access mode.

4. The method of claim 3, further comprising:
    unmounting the set of user file systems from the source storage processor; and
    mounting the set of user file systems on the destination storage processor under the root file system made accessible concurrently on the destination storage processor.

5. The method of claim 4, further comprising:
    unmounting the root file system and the configuration file system from the source storage processor upon unmounting of each user file system of the set of user file systems from the source storage processor; and updating access permission for the root file system and the configuration file system mounted on the destination storage processor to a read-write access mode.

6. The method of claim 5, further comprising:
disallowing any configuration changes for the virtual file server until the virtual file server is migrated from the source storage processor to the destination storage processor.

7. The method of claim 4, further comprising:
unmounting the root file system and the configuration file system from the source storage processor upon unmounting of each user file system of the set of user file systems from the source storage processor; and
deleting the root file system and the configuration file system mounted on the source storage processor.

8. The method of claim 1, further comprising:
creating a replica of the root file system and a replica of the configuration file system;
mounting the replicas of root file system and the configuration file system on the destination storage processor in the read-write access mode; and
marking the root file system and the configuration file system mounted on the source storage processor for deletion at a later time.

9. The method of claim 1, further comprising:
transferring ownership of a set of network interfaces associated with the virtual file server from the source storage processor to the destination storage processor upon availability of the root file system and the configuration file system on the destination storage processor.

10. A system for use in managing migration of virtual file servers, the system comprising a processor configured to:
migrate a virtual file server from a source storage processor to a destination storage processor in a storage system, wherein the storage system includes the source and the destination storage processors, wherein the virtual file server comprises a root file system, a configuration file system, and a set of user file systems; and
enable concurrent access to the root file system from both source and destination storage processors during the migration until the set of user file systems is migrated from the source storage processor to the destination storage processor.

11. The system of claim 10, wherein the migration of virtual file server from the source storage processor to the destination storage processor occurs upon occurrence of at least one of events, the events including a reboot, a failback, and a load balancing.

12. The system of claim 10, further configured to:
update access permission for the root file system and the configuration file system mounted on the source storage processor to a read-only access mode; and
mount the root file system and the configuration file system on the destination storage processor in the read-only access mode.

13. The system of claim 12, further configured to:
unmount the set of user file systems from the source storage processor; and
mount the set of user file systems on the destination storage processor under the root file system made accessible concurrently on the destination storage processor.

14. The system of claim 13, further configured to:
unmount the root file system and the configuration file system from the source storage processor upon unmounting of each user file system of the set of user file systems from the source storage processor; and
update access permission for the root file system and the configuration file system mounted on the destination storage processor to a read-write access mode.

15. The system of claim 14, further configured to:
disallow any configuration changes for the virtual file server until the virtual file server is migrated from the source storage processor to the destination storage processor.

16. The system of claim 13, further configured to:
unmount the root file system and the configuration file system from the source storage processor upon unmounting of each user file system of the set of user file systems from the source storage processor; and
delete the root file system and the configuration file system mounted on the source storage processor.

17. The system of claim 10, further configured to:
create a replica of the root file system and a replica of the configuration file system;
mount the replicas of root file system and the configuration file system on the destination storage processor in the read-write access mode; and
mark the root file system and the configuration file system mounted on the source storage processor for deletion at a later time.

18. The system of claim 10, further configured to:
transfer ownership of a set of network interfaces associated with the virtual file server from the source storage processor to the destination storage processor upon availability of the root file system and the configuration file system on the destination storage processor.

19. A computer program product for managing migration of virtual file servers, the computer program product comprising:
a non-transitory computer readable storage medium having computer executable program code embodied therewith, the program code executable by a computer processor to:
migrate a virtual file server from a source storage processor to a destination storage processor in a storage system, wherein the storage system includes the source and the destination storage processors, wherein the virtual file server comprises a root file system, a configuration file system, and a set of user file systems; and
enable concurrent access to the root file system from both source and destination storage processors during the migration until the set of user file systems is migrated from the source storage processor to the destination storage processor.

20. The computer program product of claim 19, wherein the migration of virtual file server from the source storage processor to the destination storage processor occurs upon occurrence of at least one of events, the events including a reboot, a failback, and a load balancing.

* * * * *